United States Patent [19]

Cohen et al.

[11] Patent Number: 5,585,423
[45] Date of Patent: Dec. 17, 1996

[54] ULTRAVIOLET RESISTANT GLUTARIMIDE

[75] Inventors: Leslie A. Cohen, Langhorne; Darnell DeGraff, Bensalem; Harry C. Fromuth, Trevose; Theodore D. Goldman, Washington Crossing, all of Pa.

[73] Assignee: Rohm and Haas Company, Philadelphia, Pa.

[21] Appl. No.: 639,375

[22] Filed: Jan. 11, 1991

Related U.S. Application Data

[63] Continuation of Ser. No. 346,049, May 2, 1989, abandoned.

[51] Int. Cl.$^6$ ........................................ C08K 5/34
[52] U.S. Cl. ...................... 524/102; 524/91; 524/120; 428/447
[58] Field of Search ........................ 524/91, 102, 120; 428/447

[56] References Cited

U.S. PATENT DOCUMENTS

| | | | |
|---|---|---|---|
| 3,451,838 | 6/1969 | Burzynski et al. | 117/33.3 |
| 3,616,839 | 11/1971 | Burrin et al. | 156/99 |
| 3,668,274 | 6/1972 | Owens et al. | 260/857 G |
| 3,796,771 | 3/1974 | Owens et al. | 260/857 G |
| 3,976,720 | 4/1976 | Hammer et al. | 260/857 G |
| 3,984,497 | 10/1976 | Owens et al. | 260/879 |
| 3,986,997 | 10/1976 | Clark | 260/29.2 |
| 4,000,216 | 12/1976 | Lang | 260/857 |
| 4,086,300 | 4/1978 | Owens et al. | 260/857 G |
| 4,148,846 | 4/1979 | Owens et al. | 260/885 |
| 4,167,505 | 9/1979 | Dunkelberger | 525/66 |
| 4,246,374 | 1/1981 | Kopchik | 525/329 |
| 4,371,585 | 12/1982 | Memon | 428/412 |
| 4,390,373 | 6/1983 | Nelson et al. | 106/287.12 |
| 4,410,661 | 10/1983 | Pagilagan et al. | 525/66 |
| 4,415,706 | 11/1983 | Staas | 525/183 |
| 4,442,168 | 4/1984 | Nelson et al. | 428/331 |
| 4,500,669 | 2/1985 | Ashlock et al. | 524/440 |
| 4,540,634 | 9/1985 | Ashlock et al. | 428/451 |
| 4,550,136 | 10/1985 | Hoech | 524/718 |
| 4,571,365 | 2/1986 | Ashlock et al. | 428/412 |
| 4,593,064 | 6/1986 | Hoech | 524/718 |
| 4,689,243 | 8/1987 | Kushi et al. | 427/54.1 |
| 4,702,773 | 10/1987 | Ashlock et al. | 106/287.12 |
| 4,727,117 | 2/1988 | Hallden-Abberton et al. | 525/343 |
| 4,737,409 | 4/1988 | Kushi et al. | 428/336 |
| 5,013,774 | 5/1991 | Nishida et al. | 524/91 |

FOREIGN PATENT DOCUMENTS

| | | |
|---|---|---|
| 94215 | 11/1983 | European Pat. Off. . |
| 164663 | 12/1985 | European Pat. Off. . |
| 214507 | 8/1986 | European Pat. Off. . |
| 87307578 | 8/1987 | European Pat. Off. . |
| 622888655 | 3/1989 | European Pat. Off. . |
| 58-57445 | 4/1983 | Japan . |
| 58-183729 | 10/1983 | Japan . |
| 59-25836 | 2/1984 | Japan . |
| 60-215032 | 10/1985 | Japan . |
| 62-96551 | 5/1987 | Japan . |
| 62-151465 | 7/1987 | Japan . |
| 891039935 | 12/1987 | Japan . |
| 1558877 | 1/1980 | United Kingdom . |
| 2207139 | 1/1989 | United Kingdom . |

OTHER PUBLICATIONS

Scott "Developments in Polymer Stabilisation–3" Applied Science Publishers LTD, 1980 pp. 117–139.
Article—*Acrylics and HID light sources,* Journal of IES, Jul., 1977, pp. 224–232, W. Burkhardt.
Publication—"XHTA Polymers for Nylon", Freed and Cohen Nov. 18, 1985.

*Primary Examiner*—Kriellion S. Morgan
*Attorney, Agent, or Firm*—Darryl P. Frickey; Terence P. Strobaugh

[57] ABSTRACT

Polymers of (N-lower alkyl)dimethylglutarimide or (N-hydrogen)dimethylglutarimide are resistant to surface crazing, molecular weight degradation and yellowing on exposure to ultraviolet light, by inclusion of a hindered amine stabilizer.

14 Claims, No Drawings

ULTRAVIOLET RESISTANT GLUTARIMIDE

This application is a continuation of application Ser. No. 346,049, filed May 2, 1989 now abandoned.

FIELD OF THE INVENTION

This invention relates to ultraviolet resistant N-(hydrogen)glutarimide or N-(lower alkyl)glutarimide polymers which reduce or eliminate surface cracking or crazing and color generation caused by exposure to sunlight or other sources of ultra-violet light, especially if the polymers are at the same time subjected to heat. It further relates to stabilization by use of a single class of stabilizers known as hindered amines. It further relates to such stabilized polymers also containing other types of light stabilizers including ultraviolet absorbers, such as benzotriazoles, useful in conventional stabilization in the absence of heat, and thermooxidative stabilizers, such as organophosphites or organophosphonites, useful in the retention of good color during processing of the polymers. It further relates to the use of the stabilized polymers as protective coverings, for example, for use as high intensity discharge lamps which emit ultraviolet radiation and generate heat.

BACKGROUND OF THE INVENTION

U.S. Pat. No. 4,246,374 discloses thermally stable polyglutarimide polymers and a practical process for their preparation. These polymers, especially those prepared from poly(methyl methacrylate) and monomethylamine or ammonia in a devolatilizing extruder, are useful as clear glazing or protective materials and have acceptable impact and modulus properties with a higher service temperature than other clear thermoplastics. U.S. Pat. No. 4,727,117 discloses that a reduction of acid content in such polyglutarimides by a post-polymerization reaction affords poly(glutarimides) of improved chemical resistance, including water resistance, miscibility, and melt flow.

Poly(glutarimides) are among the best thermoplastics in resistance to weathering. However, they exhibit surface degradation on exposure to ultraviolet (UV) radiation from the sun or from artificial light sources that causes cracking or crazing of the polymer surface, eventually affecting appearance, transparency and resistance to impact. Conventional ultra-violet stabilizers absorbing in the spectral range of the damaging ultraviolet radiation (ca. 300 nm wavelength) have proved effective in stabilizing samples not exposed to high temperatures, including stabilization of the interior of the polymer specimen.

Glutarimides are used, for example, in the protection of high intensity discharge lamps, such as those used in street lamps, automotive lighting, and the like. Such lamps generate large amounts of heat and emit a portion of their radiation in the UV spectrum. Since it is desirable to use as small an enclosure as possible, the protective unit is designed so as to operate at as high a temperature as possible consistent with the maintenance of the plastic's shape and modulus. Poly(methyl methacrylate), otherwise a good choice for stability and clarity, fails because the service temperature is too low, and polycarbonate, which has adequate service temperature, fails because it cannot be readily stabilized against UV light.

Polyglutarimides, especially those with a high proportion of (N-methyl)dimethylglutarimide mers, exhibit adequate thermal stability up to at least about 20° C. below the glass temperature. It is desirable to extend their stability to ultraviolet exposure, to lower the cost and extend the timing for replacement, especially as many potential uses are in installations difficult to access, such as street lights and the like.

Stabilization of polyglutarimides against these severe conditions may be accomplished with conventional UV stabilizers, such as benzotriazoles, but amounts exceeding one weight percent are required, adding additional cost. Further, certain benzotriazole stabilizers containing an aromatic hydroxy group, after processing into polyglutarimide, have a higher initial color rating than desired.

It has been known to stabilize methyl methacrylate polymers with hindered amine stabilizers which do not absorb in the sun-tanning wave length to prepare protective covers for ultra-violet lamps in sun-tanning baths; see U.S. Pat. Nos. 4,550,136 and 4,593,064 and European Patent Application 164,663.

Japanese Kokai 58-57445 teaches a specific type of hindered amine stabilizer containing a disulfide bond as suitable for stabilization of plastics against light, although not against the specific combination of heat and light of concern to the present invention. In a list of polymers is the term "polyimide", but it is clear that the term refers to linear imide polymers containing aromatic rings joined by imide functionality, not the aliphatic imides employed in this invention.

Japanese Kokai 62-151465 teaches stabilization of polymers having an imide group on the side chain with a stabilizer combination of a hindered phenol of MW above 300 and a broad class of photostabilizers, including benzotriazoles and hindered amines. The imide groups on the side chain includes five-membered imides derived from maleic anhydride and maleimide, and refers to, but does not exemplify, imides prepared by imidization of a polymer having methacrylic acid groups, but not methyl methacrylate groups. There is no teaching of the singular effect at high use temperatures imparted by the stabilizers of the present invention, nor any teaching that the hindered amine may be used as the sole stabilizer.

Japanese Kokai 58-183729 broadly teaches the use of organophosphorus compounds to improve impact strength and lessen thermal discoloration of polymers having imide side chains. It does not describe the specific imide polymers employed here, nor exemplify any glutarimide polymer. It does not suggest the use of the hindered amines of the present invention.

It is an object of this invention to stabilize polymers against surface crazing on exposure to ultraviolet light, especially at temperatures near the glass temperature of the polymer. It is a further object to provide a stabilizer which does not contribute to color of the polymer on weathering, is stable to exposure to the weather such as rain, hail, sleet, and snow, that stabilizes against loss of polymer toughness, and which is useful at low levels. It is a further object to provide a stabilized poly(N-lower alkyl)dimethylglutarimide or poly(N-hydrogen)dimethylglutarimide polymer useful in the manufacture of protective housings for lamps.

SUMMARY OF THE INVENTION

It has been discovered that hindered amine stabilizers, containing one or more functional groups of the formula:

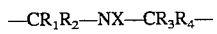

where $R_1$, $R_2$, $R_3$, and $R_4$ may be the same or different lower alkyl group, for example lower alkyl of from 1 to 4 carbon atoms such as methyl, ethyl, propyl, butyl and the like, and X is H, lower alkyl (as defined above) or a radical of the formula:

$$-CH_2-CH_2-O-, \text{ or } -O.$$

impart excellent stability against the combined effects of ultraviolet light and heat up to about 130° C. (which is below the glass temperature of poly (N-lower alkyl)dimethyl glutarimide), as measured by lack of crazing and discoloration.

It has been further discovered that such polymers may be stabilized against discoloration by the further addition of an organophosphite or organophosphonite during fabrication of the polymer. A further discovery is that the combination of the hindered amine and a benzotriazole stabilizer is effective in maintaining polymer stability against surface degradation under outdoor weathering conditions.

DETAILED DESCRIPTION

By polymers containing mers of N(lower alkyl)dimethylglutarimide is meant polymers with mers of the formula:

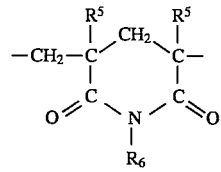

where $R_5$ is methyl, and $R_6$ is lower alkyl of from 1 to 4 carbon atoms such as methyl, ethyl, propyl, butyl and isomers thereof.

By polymers containing mers of N(hydrogen)dimethylglutarimide is meant polymers with mers of the formula:

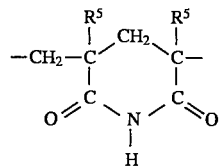

where $R_5$ is methyl.

Preferred for high service temperature are polymers where the weight percent of such glutarimide mers is from about 30% to about 90% of the composition. Such polymers have a glass temperature or Vicat softening temperature of at least about 140° C.

Other mers may be present. Preferred mers are those derived from methacrylic acid, acrylic acid, maleic acid, fumaric acid and the like; esters of these acids such as lower alkyl esters; cyclic anhydrides of these acids; amides of these acids, especially N(lower alkyl)amides; styrene; alpha-methylstyrene; and alkyl styrenes. More preferred are mers selected from lower alkyl methacrylates, or lower alkyl acrylates, such as methyl methacrylate, or methyl or ethyl acrylate. Especially preferred are mers of methyl methacrylate.

The polymer is preferably prepared by the method of U.S. Pat. No. 4,246,374 because this process affords polymers having excellent thermal stability and clarity, but other methods may be used, such as the reaction of poly(methyl methacrylate) with monomethylamine in a pressurized kettle at high temperature; reaction of polymers with a high percentage of methyl methacrylate mers with a primary alkyl amine in an appropriate solvent; or reaction of polymers with a high percentage of N-methylmethacrylamide mers to eliminate methyl amine.

Further reaction of the imidized polymer with acid-reducing agents, as taught by U.S. Pat. No. 4,727,117 afford a poly(glutarimide) exhibiting lower water uptake and improved thermal stability on processing. Such acid-reducing agents include orthoesters, ketals, carbonates, and the like. Preferred agents are trimethyl orthoformate, triethyl orthoformate, and dimethyl carbonate. Both acid-reduced and untreated poly(glutarimides) may be stabilized against weather or the effects of light and heat in combination by the stabilizers taught herein.

The hindered amines may be added to the glutarimide polymer by post-compounding of additives and unstabilized powder or pellets of the glutarimide polymer, or by addition during or prior to the imidization or acid-reduction steps. A preferred method is to add the hindered amine, along with any other additives such as toners, colorants, antioxidants, other stabilizers, and the like, to the molten glutarimide or acid-reduced glutarimide polymer prior to extrusion into pellets, strands, sheet, or film. This process exposes the polymer and the additive to less heat history than reprocessing of already extruded polymer. Preferred are the hindered amines where $R_1=R_2=R_3=R_4=$methyl and X=H. Examples of hindered amines which can be employed include: bis-(2,2,6,6-tetramethyl-4-piperidinyl)sebacate; 2,2,6,6-tetramethyl-4-piperidinyl)benzoate, 1,2,3,4-tetrakis (2,2,6,6-tetramethyl-4-piperidinyl)butane tetracarboxylate; 1,2-bis(2-oxo-3,3,5,5-tetramethyl-1-piperidinyl)ethane; 1-(3,5-di-tert-butyl-4-hydroxyphenyl)-2,2-bis(2,2,6,6-tetramethyl-4-piperidinyloxycarbonyl)-hexane; poly(1-oxyethylene(2,2,6,6-tetramethyl-1,4-piperidinyl)oxysuccinyl; N,N'-bis(2,2,6,6-tetramethyl-4-piperidinyl)-1,6-hexanediamine; (4-hydroxy-2,2,6,6-tetramethyl-1-piperidine)ethanyl; poly(2-(1,1,3,3-tetraethylbutylimino )-4,6-triazinediyl-(2,2,6,6-tetramethyl-4-piperidinyliminohexamethylene-(2, 2,6,6-tetramethyl-4-piperidinyliminohexamethylene-(2,2,6, 6-tetramethyl-4-piperidinyl)imino or their N-methyl derivatives.

Especially preferred for reasons of non-volatility and compatibility are hindered amines containing one or more groups with the structure

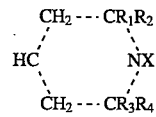

wherein $R_1$, $R_2$, $R_3$ and $R_4$ are methyl and X is H, methylene or $-CH_2-CH_2-O-$. The groups may be joined together by aliphatic ester, aromatic ester, heterocyclic carbon-nitrogen materials, such as melamine groups, and the like. Especially preferred is bis(2,2,6,6-tetramethyl-4-piperidyl)sebacate.

The use level of such hindered amines may be in the range of from about 0.05 to about 1 weight percent for most efficient cost utilization/stability balance. Higher levels may be used without adversely affecting properties. A preferred use level is in the range of from about 0.12 to about 0.50 weight percent, and an especially preferred use level is in the range of from about 0.20 to about 0.30 weight percent.

Thermal stabilizers for the processing and molding of the polyglutarimide may be present without detracting from the UV stability of the stabilized composition. A preferred class of thermal stazilizer are organophosphites, such as tris(aryl)- or tris(alkylaryl)-or tris(alkyl)-phosphites, such as tris-(nonylphenyl)phosphite, tris(2,4-di-tert-butylphenyl)phosphite, distearyl pentaerythritol diphosphite and the like.

Another preferred class is that of organophosphonites, such as trisaryl, trisalkaryl-or aryldialkaryl phosphonites, such as aryl-di(alkylphenyl)phosphonites. Preferred are acid-stable tris(2-alkylaryl)phosphites, such as tris(2-tertiary alkylaryl)phosphites, or aryl di(2-alkylaryl)phosphonites. Especially preferred are tris(2,4-tertbutylphenyl)phosphite or tetrakis(2,4-di-tert-butylphenyl) 4,4'-biphenylylene diphosphonite.

Examples of benzotriazole stabilizers, useful for the protection of glutarimides and other polymers by functioning as absorbers of the harmful portion of the UV spectrum, are 2-(2'-hydroxy-5'-methylphenyl)benzotriazole; 2-(2'-hydroxy-3',5'-di-tert-butyl)5-chlorobenzotriazole; 2-(2'-hydroxy-3'-tert-butyl-5,5'-methylphenyl)5-chlorobenzotriazole; 2-(2'-hydroxy-3,5'-di-tert-butylphenyl)benzotriazole; 2-(2'-hydroxy-3',5'-di-tert-butyl-phenyl)benzotriazole; 2-(2'-hydroxy-5'-tert-butyl-phenyl)benzotriazole; 2-(2'-hydroxy-5'-octylphenyl)benzotriazole; of which 2,2'-dihydroxy-5'-methylphenyl)benzotriazole and 2-(2'-hydroxy-5'-tert-octylphenyl)benzotriazole are preferred.

The levels of thermostabilizer used and of UV-absorbing stabilizer used need not be the same in the stabilized plastic. The lower level of effectiveness of the UV stabilizer generally will be in the range of from about 0.01 percent to about 1%. Higher levels may be used. The preferred range of stabilizer is from about 0.10 to about 0.50 percent of the benzotriazole and about 0.05 to about 0.30 of the organophosphite or organophosphonite, based on weight of the glutarimide matrix polymer.

The resulting polymer blend may be molded at temperatures recommended for glutarimide polymers, which range from about 270° to about 330° C. The polymers may be extruded into film, formed into parisons and blown, or may be compression or injection molded into useful articles.

Such useful articles where stabilization to light and heat is desirable are windows, protective shields, housings, and the like for heat-emitting light sources, especially those which emit ultraviolet light or are severely exposed to same during use. Such include lighting for cars, trucks, airplanes, buses, and the like, especially head- or tail-lamp enclosures, high intensity discharge lighting, such as from metallic vapors, mercury sources, sodium vapor, sunroofs for automobiles, buses, boats, and the like.

The stabilized polyglutarimides of the present invention are also useful in applications as sheet, film, molded articles, or extruded articles not requiring high values of clarity or visible light transmittance. One such use will be in pigmented or colored articles, such as automotive exterior lighting in yellow, red, orange, and the like such as colored tail-lights. A second use will be in surface-altered articles having a matte finish to lower reflectance, alter contact behavior with other surfaces, and the like. Such articles may be prepared by surface roughening, such as extrusion over roughened rolls, by use of certain inorganic fillers, or by use of surface-altering plastic additives with similar refractive indices, such as disclosed in U.S. Pat. No. 4,000,216.

The object may be completely opaque, as will occur in a highly-filled system with an opaque additive or pigment, such as wollastonite, talc, titanium dioxide, and the like. The opaque formulation may also be a blend with an incompatible plastic, or preferably a blend with a compatible plastic which blend also contains an opaque additive. For example, a blend of the stabilized glutarimide with poly(vinyl chloride), said blend also containing an acrylic impact modifier and a pigment such as titanium dioxide, will be opaque and will be useful as extruded siding for outdoor applications, especially in dark colors.

The articles mentioned above may be coated or protected from abrasion by cleaners, storage, dirt, and the like, by use of coatings similar to those taught for non-stabilized glutarimide polymers. Appropriate coatings are preferably based on multi-functional acrylic monomers, or on siloxane chemistry, and appropriate technology for forming and applying such coatings is found in such patents as U.S. Pat. Nos. 4,689,243, 4,737,409, 3,451,838, and 3,986,997, as well as Japanese Kokai 85-215032.

The abrasion-resistant coatings may further contain colloidal dispersions of silica, such as is taught in U.S. Pat. No. 3,986,987, or other metallic materials, such as taught in U.S. Pat. Nos. 4,390,373, 4,442,168, 4,500,669, 4,540,634, 4,571,365, and 4,702,773. Such abrasion-resistant coatings may be applied with a tie layer imparting flexibility and better adhesion between the abrasion-resistant coating and the stabilized poly(glutarimide) substrate, such as by use of a solution of an acrylic polymer or a polysiloxane; the latter is taught in U.S. Pat. No. 3,616,839. The abrasion-resistant topcoat and/or the tie layer may contain an appropriate stabilizer against the effects of ultra-violet light, as is taught in U.S. Pat. No. 4,371,585.

It has been difficult to maintain such coatings on poly(glutarimide) substrates, possibly due to failure at the interface. The polymers of the present invention will be less susceptible to such degradation. Additional means to improve adhesion include etching of the surface, either physically or with an appropriate solvent, prior to application of the coating, use of an adhesive tiecoat between abrasion-resistant coating and the substrate, and/or use of an ultraviolet stabilizer in the coating to protect against degradation at the surface.

It is also possible to use films or sheets of polyglutarimides stabilized as in this invention to protect polymers such as unstabilized glutarimides, polycarbonate, and the like, by formation of laminates or overlays. The composite structures may be formed by co-extrusion of layers, by laminating together layers of pre-formed film or sheet, or by other techniques for making laminated structures that will be readily apparent to those skilled in the art.

The layers of the structure are adherent to one another; they may adhere as a result of being co-extruded, of being glued together with a suitable type of adhesive, or of other adhesion processes. The adhesives and the other adhesion processes may be readily selected by those skilled in the art.

The layers of the structure are preferably continuous layers, and more preferably they have a uniform thickness. That is, they do not have discontinuities, holes, thin spots and the like. The preferred thickness of both the gas-barrier layers of the stabilized polyglutarimide and of the more permeable layers is from about 0.02 mm to about 10 mm; the layers may be of equal or different thickness. The adhesive, where used, is not usually considered a layer, unless it forms a continuous layer from about 0.02 to about 10 mm thick which is more permeable than the gas-barrier layer.

The composite structure may be biaxially oriented, uniaxially oriented or unoriented.

The uses to which such composite structures may be placed are many. Films may be used in the packaging of many foodstuffs, such as meat, snacks, boil-in-the-bag items such as frozen vegetables, and the like. Containers suitable for the packaging of carbonated or oxygen-sensitive beverages, such as colas, ginger ale, fruit juice, and the like, may be prepared. Containers suitable for hot-fill or sterilization may be molded from suitable injection-molded or extruded parisons. Such containers or bottles may be used for packaging of condiments, ketchup, maple syrup, and the like.

They may also be used for heat-sterilized containers, such as for intravenously administered fluids, and the like.

The stabilized poly(glutarimides) of the present invention may be used in combination with reinforcing or filler materials, such as glass fibers, polymeric fibers, glass beads, titanium dioxide, talc, mica, clay, and the like. They may also be used in combination with other polymers with which they are compatible (i.e. with which they may be blended, such as poly(vinyl chloride), polycarbonates, polyesters, and the like. Many uses already established for such blends using the unstabilized poly(glutarimide) require exposure to outdoor or short-wavelength light, where the stabilized composition of the present invention should exhibit improved stability.

EXPERIMENTAL

The following examples are intended to merely illustrate the present invention and not to limit it. All percentages are by weight unless otherwise specified.

Accelerated testing is used to judge exposure resistance in all but one example. In some accelerated tests, the measurement of surface molecular weight degradation is used to quantify the extent of surface degradation; it has been found that this measurement is useful to predict the onset of crazing.

Testing not involving high temperatures has been conducted with QUV-B fluorescent lights (manufactured by the Q-Panel Co., Cleveland, Ohio), which emit a large portion of the total light in the 300–320 nm wave length range.

The test method follows those of ASTM G-53, "Light/Water Exposure of Non-Metallic Materials" and ASTM D-4329, "Light/Water Exposure of Plastics", except that in the present testing no water cycle is used and the lights were run continuously at 46°±2° C.

Other testing was done with high intensity discharge lamps. A review of use of acrylic plastics with such lamps is found in W. C. Burkhardt, J.I.E.S., pp. 224–232, July 1977. The Burkhardt article, p. 224, describes the test unit used. It is a rotating cylinder rotating around a HID lamp, the center of the plaques being about 127 mm. from the center of the light source. The temperature of the surrounding air was controlled by a blower and fan. The light sources were:

Mercury vapor: General Electric Multi-Vapor MVR/4000, a 400 watt clear lamp;

Phosphor-coated mercury vapor: General Electric H400DX33-1, a 400-watt lamp;

Metal Halide: Sylvania Metalarc M 4000; and

High Pressure Sodium: Lucalux 400 watt.

Preparation of Imides

In general the polymers of the present invention are prepared by the reaction of a poly(methyl methacrylate) homopolymer of $MW_w$ ca. 150,000 or a methyl methacrylate/ethyl acrylate 96/4 copolymer of MW ca. 125,000 with monomethylamine or ammonia in a devolatilizing twin-screw reactor. If reduction of the acid/anhydride content is desired, the reaction with the agent for reducing acid/anhydride is conducted on the polymer in a continuous manner, i.e., the glutarimide polymer is not isolated prior to the acid-reducing reaction, but the molten glutarimide is carried to an adjacent zone in the extruder and there reacted with the agent, after which the acid-reduced glutarimide is isolated by stranding, cooling, and pelletizing.

The process for making polyimides and reducing or substantially eliminating acid and anhydride functionality involves determining the amount of acid and anhydride of the polyimide prior to treatment with an agent by removing a sample of polyimide prior to reaction with the agent for reducing acid and anhydride functionality and titrating the amount of acid and anhydride present. A calculated amount of the agent, based on the desired acid and anhydride level is then added. Alternatively, one may determine the amount of agent to add by preparing the polyimide under the same conditions to be used in the continuous process, and then measuring the acid and anhydride level. As long as the feed stock is converted to the same polyimide and treated with the agent under the same conditions, the resultant final product is substantially the same. The extruder used is a 2.0 cm. non-intermeshing counter-rotating twin screw extruder. The extruder has one section about six diameters long, for introducing and plasticating the polyglutarimide followed by a closed barrel section about 6 diameters long for pumping and pressure generation, followed by the reaction zone. This zone, about 31.5 diameters long, comprises a ported barrel section for introducing blocking agents (i.e. acid reducing agents), closed barrel sections, and a venting section for removing volatile products. Another vented section, operated at substantially atmospheric pressure, following the reaction zone, for removing additional volatiles. Larger extruders, such as a 5.1 mm. extruder may be used to achieve similar results. The first (imidization) zone is 61 cm. long, and is equipped with means for adding solid polymer and methylamine. The feed rate of the polymer is about 60–75 grams/minute. The barrel temperature in the imidization zone is about 300° C. When methylamine is used it may be added at a rate of 21–23 grams/minute, and a gauge pressure of 6890 kPa; for other preparations methylamine feed rate is about 19 grams/minute, and the gauge pressure in the range of from 5200 to 5800 kPa.

Samples of PGI-2 and PGI-4 were isolated at this point without further reaction. Samples PGI-1 and -3 were conveyed into the second zone as described above. Within this zone of ca. 31 cm. in length were means for adding the acid-reducing reagent and means for venting volatile products. Another venting section followed for further devolatilization. The barrel temperature was 288° C. The pressure was 3100 kPa. The feed rate of DMC was 8 to 10 cc./minute.

The vicat softening temperatures of the polymers are: PGI-1; 145; PGA-2, 150; PGA-3 149; and PGA-4 170° C.

The following examples illustrate the transmission at various wavelengths of 2 mil (50 micrometer or 50 micron) films of poly(N-methyl)dimethylglutarimide containing a benzotriazole or a hindered amine stabilizer or both. Benzotriazole greatly lowers the transmittance between 290 and 365 mm, whereas the hindered amine containing material is essentially transparent at those wave lengths. Similar results (with of course decreasing transmittance values) were seen for thickness of 126 and 254 microns.

EXAMPLES 1–5

A poly(N-methyl)dimethylglutarimide, prepared by about 75% conversion to imide groups of a poly(methyl methacrylate) of ca. 150,000 MW by the method described above, and further treated with dimethyl carbonate to reduce the acid, is compounded with 2-(2'-hydroxy-5'-tert-octylphenyl)benzotriazole (HOB). In one example, di(2,2,6,6-tetramethyl piperidinyl)sebacate (HA-1), is also added.

Compounding is accomplished by blending pre-dried pellets of the glutarimide with weighed amounts of the stabilizer(s), charging the blend to the hopper of a 2.54 cm. diameter single-screw Killion extruder, and extruding the mixture into pellets, utilizing a melt temperature of between 270° to 280° C. The samples were compression molded in a Carver press with a spacer of appropriate thickness to form a 10×10 cm. shaped film. The pre-dried pellets were weighed, pre-heated for three minutes, then pressure applied for 7 minutes. The film and spacer were then placed in a second Carver press at a temperature below 100° C. to cool. The temperature of the mold was 249° C. for the 126 and 254 micron films, and 271° C. for the 50 micron films. The UV transmission was measured in a Perkin-Elmer Model 552 spectrophotometer; nm=nanometers.

TABLE 1

ULTRAVIOLET TRANSMISSION OF POLYGLUTARIMIDE CONTAINING A BENZOTRIAZOLE AND A HINDERED AMINE

| Example Number | Stabilizer, wt. % | Transmission, % | | |
|---|---|---|---|---|
| | | 290 nm | 320 nm | 400 nm |
| 1 | — | 80 | 87 | 90 |
| 2 | HOB 0.25 | 20 | 20 | 90 |
| 3 | HOB 0.25 HA 1 0.25 | 20 | 20 | 90 |
| 4 | HOB 0.50 | 3 | 3 | 90 |
| 5 | HOB 1.00 | 0.2 | 0.2 | 89 |

EXAMPLE 6

This example illustrates the decrease in molecular weight upon irradiation of the samples of Examples 1–5. Upon exposure to the QUV-B radiation (emits its peak radiation at 313 nanometers) at 46° C. for 500 hours, it is seen that the HA-1 gives no additional protection in combination with HOB; these results were confirmed on irradiation of the 125 and 250 micrometer thick films. However, upon exposure to a 400 watt clear mercury vapor lamp at 110° C. for 500 hours, the protective advantage of the HA-1 was seen, being more effective at 0.25 weight-percent than the HOB at 1.0 weight-percent.

TABLE 2

[DECREASE IN] MOLECULAR WEIGHT OF POLYMER AT PANEL SURFACE WITH HIGH UV, LOWER TEMPERATURE ILLUMINATION AND WITH HID MERCURY ILLUMINATION
$MW_{wx}10^{-3}$ after irradiation

| Example No. | Stabilizer, wt % | QUV-B | Mercury | None |
|---|---|---|---|---|
| 1 | — | 22 | 25 | 143 |
| 2 | HOB 0.25 | | 79 | |
| 3 | HOB 0.25 and HA-1 0.25 | 55 | 116 | |
| 4 | HO[D]B 0.50 | 75 | 87 | |
| 5 | HOB 1.00 | 117 | 109 | |

EXAMPLES 7–11

These examples further illustrate the added stabilization imparted by HA-1 to two mil films (similar to those of Examples 1–5) on exposure to various high intensity sources. The clear mercury vapor lamp is that described in Example 6, and exposure is again at 500 hours; exposure to the metal halide lamp is for 500 hours, and to the high pressure sodium lamp is for 1845 hours. Although degradation is less for these sources of heat and light than for the mercury vapor lamp, the results are similar.

TABLE 3

EXPOSURE TO SEVERAL SOURCES OF HID RADIATION

| Example No. | Stabilizer, wt. % | $MW_{wx}10^{-3}$ after irradiation | | |
|---|---|---|---|---|
| | | Mercury | Metal Halide | Sodium |
| 7 | — | 25 | 92 | 91 |
| 8 | HOB 0.25 | 79 | 97 | 99 |
| 9 | HOB 0.25 HA-1 0.25 | 116 | 126 | 132 |
| 10 | HOB 0.50 | 87 | 114 | 115 |
| 11 | HOB 1.00 | 109 | 126 | 124 |

EXAMPLES 12–20

These examples illustrate the effect of various stabilizer combinations of 2 mil films exposed to QUV-B and metal halide (MH) high intensity light. The preparation and testing methods, as well as the HA-1 and HOB stabilizers, are as in Examples 1–11. The phosphite stabilizer is tris(nonylphenyl)phosphite (TNPP). In some examples, the imide is the acid-reduced imide of Example 1, identified as PGI-#1 in the tables; in others, the imide is the corresponding non-acid reduced imide, identified as PGI-#2. In both cases, the films contain 0.2 wt. % fatty alcohol lubricant.

The results show that for both imides the stabilizing effect of the hindered amine was indicated only for the combination of heat and ultraviolet exposure. They further show that the presence of HOB is not required for HA-1 to impart stability. They further show that TNPP is an ineffective stabilizer of molecular weight, although the additive is useful in high-temperature processing of molten glutarimide polymer. They further show that the stabilization by HA-1 at high temperature occurs with both acid-reduced and non-acid reduced glutarimide polymer.

TABLE 4

Films Based on PGI-#1: Additives and Molecular Weight Values at Various Exposure Times

| Composition | Ex. 12 | Ex. 13 | Ex. 14 | Ex. 15 | Ex. 16 |
|---|---|---|---|---|---|
| TNPP | — | 0.15 | 0.15 | 0.15 | 0.15 |
| HOB | — | — | 0.25 | — | 0.25 |
| HA-1 | — | — | — | 0.25 | 0.25 |
| MH, 492 hrs. | 86.1 | 70.5 | 93.3 | 134 | 128 |
| MH, 777 hrs | 50.7 | 59.2 | 84.4 | 130 | 126 |
| MH, 1008 hrs. | — | — | 65.8 | 120 | 122 |
| QUV-B, 48 hrs. | 110 | 119 | 137.5 | 121 | 138.6 |
| QUV-B, 164 hrs. | 62.5 | 67.9 | 101.1 | 74 | 102.4 |

TABLE 5

Films Based on PGI-#2: Additives and Molecular Weight Values at Various Exposure Times

| Composition | Ex. 17 | Ex. 18 | Ex. 19 | Ex. 20 |
|---|---|---|---|---|
| HOB | — | 0.25 | — | 0.25 |
| HA-1 | — | — | 0.25 | 0.25 |
| MH, 492 hrs. | 75.6 | 80.7 | 122 | 116 |
| MH, 777 hrs. | — | 49.0 | 77.6 | 115 |
| QUV-B, 48 hrs. | 122.1 | 139.7 | 128.7 | 135.7 |
| QUV-B, 164 hrs. | 69.4 | 107.1 | 78.7 | 100.6 |

EXAMPLE 21–22

The preparations of Examples 16 and 20 are repeated but with a small amount (0.8 ppm) of a blue toner (1-p- toluidino-4-hydroxyanthroquinone) added to improve appearance. The effects of the irradiation on molecular weight were almost identical to the untoned samples.

EXAMPLES 23–26

The following examples illustrate the effect of the combination of a benzotriazole stabilizer 2-(2'-hydroxy-5'-methylphenyl)benzotriazole (HMB) and HA-1 on the outdoor weathering of non-acid reduced imide polymer. In this example, the glutarimide polymer, designed PGI-#3, was prepared by treatment with methylamine of a copolymer of methyl methacrylate 96/ethyl acrylate 4 of $MW_w$ 150,000, to an extent of imidization of ca. 62%, Vicat softening temperature 149° C., % N=5.2.

The weathering studies were conducted on 63.5 mm×50.8 mm×3.18 mm injection-molded plaques, the polymer containing no other additives than those tabulated. Exposure was for 36 months at a 45 degree south angle in Miami, Fla. Heavy crazing indicates surface cracks which were numerous and long (25–50 mm.); slight means several point cracks barely perceptible. Additives were in parts per hundred parts of resin. The great improvement in stability from the additive combination over that from the benzotriazole alone was not expected based on previous accelerated (QUV-B) studies, such as from Examples 3 and 4.

TABLE 6

OUTDOOR WEATHERING STUDY WITH VARIOUS ADDITIVES

| Additives | Ex. 23 | Ex. 24 | Ex. 25 | Ex. 26 |
|---|---|---|---|---|
| HMB | — | 0.25 | 0.50 | 0.25 |
| HA-1 | — | — | — | 0.25 |
| Crazing | heavy (1) | heavy | heavy | slight |

(1) Crazing in this sample occurs on the rear or unexposed side.

EXAMPLES 27–30

The following examples illustrate the effect on color of several samples given long-term exposure to the phosphor-coated mercury vapor high intensity discharge (HID) source. The samples exposed are similar to those of Examples 23–26, except that the sample containing only the benzotriazole was at 0.5 phr. Also a sample containing benzotriazole and an anti-oxidant octadecyl 3,5-di-tert-butyl-4-hydroxyhydrocinnamate (DBHC) was tested.

In these experiments, the HA-1 stabilizer in combination with a lowered amount of HMB produces a lowered color after long exposure (5800 hours). The molecular weight measurements were made on polymer taken from the top 0.13 mm. of the plaque surface with a shaper.

TABLE 7

COLOR STUDIES OF HID IRRADIATED SURFACES

| Additives | Ex. 27 | Ex. 28 | Ex. 29 | Ex. 30 |
|---|---|---|---|---|
| HMB | — | 0.50 | 025 | 0.25 |
| HA-1 | — | — | — | 0.25 |
| DBHC | — | — | 0.25 | — |
| MWw of exposed surface, × 10⁻³ | 30 | 100 | 82 | 97 |
| Yellowness index | | | | |
| Initial | 3.3 | 4.9 | 4.0 | 4.8 |
| Exposed | 9.9 | 9.5 | 8.6 | 7.0 |

EXAMPLES 31–36

The following examples illustrate preparation of several blends for comparison of HID exposure with heat exposure. Polyglutarimides PGI-#1 and PGI-#2 are described in Example 12. Blends were made as previously by melt blending and extrusion; the test plaques were 76.2×50.8×3.18 mm. All concentrations are in phr.

TABLE 8

EXPOSURE OF SEVERAL BLENDS TO HEAT ONLY

| Blend | Ex. 31 | Ex. 32 | Ex. 33 | Ex. 34 | Ex. 35 | Ex. 36 |
|---|---|---|---|---|---|---|
| Imide | PGI-#1 | PGI-#1 | PGI-#1 | PGI-#2 | PGI-#2 | PGI-#2 |
| HOB | 0.25 | 0.25 | 0.25 | 0.25 | 0.25 | — |
| HA-1 | — | 0.25 | 0.25 | — | 0.25 | 0.25 |
| TNPP | — | — | 0.15 | — | — | — |

EXAMPLES 39–43

The following table (Table 9) illustrates the effect of exposure of the samples from Table 8 to various temperatures and light sources. The time of exposure was 4032 hours. Heat aging was carried out in a forced hot air oven. The additives increased initial color of the moldings. The presence of the hindered amine stabilizer with the combination of heat and UV light showed dramatically improved performance over the benzotriazole stabilizer alone. Use of the phosphite antioxidant in the acid-reduced sample gave even lower color development. Results were similar for the non-acid reduced imide and when the sodium vapor lamp was used, although the rate of color development was slower for all samples in that series.

TABLE 9

COLOR DEVELOPMENT UNDER VARIOUS HID CONDITIONS

| Examples | Ex. 38 | Ex. 39 | Ex. 40 | Ex. 41 | Ex. 42 | Ex. 43 |
|---|---|---|---|---|---|---|
| Blend | Ex. 31 | Ex. 32 | Ex. 33 | Ex. 34 | Ex. 35 | Ex. 36 |
| Yellowness Index | | | | | | |
| Original | 4.8 | 5.9 | 3.6 | 4.0 | 4.7 | 4.4 |
| Heat only | | | | | | |
| 80° C. | 4.2 | 4.9 | 3.4 | 3.2 | 4.6 | 4.0 |
| 100° C. | 4.0 | 4.9 | 3.4 | 3.7 | 4.8 | 4.2 |
| 110° C. | 6.2 | 7.6 | 5.5 | 5.0 | 6.3 | 6.0 |
| Metal Halide | | | | | | |
| 80° C. | 11.5 | 3.6 | 2.2 | 9.0 | 5.2 | 4.4 |
| 100° C. | 16.0 | 3.2 | 2.2 | 12.6 | 5.2 | 4.6 |
| 110° C. | 18.5 | 5.2 | 2.5 | 14.0 | 5.2 | 5.0 |
| High Pressure Sodium | | | | | | |
| 80° C. | 3.7 | 3.5 | 2.0 | 3.6 | 4.4 | 4.0 |
| 100° C. | 3.8 | 3.4 | 1.9 | 3.8 | 4.9 | 4.0 |
| 110° C. | 6.4 | 3.5 | 2.1 | 5.6 | 5.0 | 4.6 |

EXAMPLES 44–50

The following examples demonstrate the stabilizing effect of other hindered amines with the acid-reduced imide of Example 1. Films 50.8 mm. thick are prepared and tested with the mercury HID source described in Example 1 for molecular weight loss. Plaques molded (as in Example 23)

of 3.18 mm. thickness are exposed under test conditions I (5000 hours, 100° C.) or II (800 hrs., 130° C.) to heat alone. In all cases except the controls, 0.25 phr of a hindered amine is used. Except for a control, 0.25 phr of benzotriazole stabilizer HOB was present.

It is noted that all hindered amine stabilizers (in combination with the benzotriazole) imparted more molecular weight stability than HOB alone, and that HA-1 was the most preferred.

In relationship to heat testing alone, it was noted that initial yellowness indices are higher for all the hindered amine materials tested, and that the materials were ineffective in stabilizing against color buildup at a test temperature of 130° C. At the Condition I temperature, the HA-1 stabilized to the extent that almost matched the control.

Hindered Amines Employed

Bis(1,2,2,6,6-pentamethyl-4-piperidnyl)-3,5-di-tert-butyl-4-hydroxybenzyl)butylpropanedioate (HA-2) contains both hindered amine and hindered phenol antioxidant functionality.

A polymer of 4-amino-2,2,6,6-tetramethyl piperidine joined at the 4-position to 1,6-hexamethylene and 2,6-(4-N-morpholino)triazine units (HA-3).

A polymer of 4-amino-2,2,6,6-tetramethyl piperidine joined at the 4-position to 1,6-hexamethylene and 2,6-triazine units (HA-4).

Poly [1-(2-ethyl)-2,2,6,6-tetramethyl-4-piperidinyl]succinate (HA-5).

a Carver press. The plates are held at a temperature of 271° C. Polyester sheeting is used to avoid sticking to the metal plates. Contact pressure is applied for two minutes following mold closure, followed by one minute at 34,500 kPa. The sample and plates are removed from the press and allowed to cool in a cold press under contact pressure.

Oxygen permeation values are determined using a Mocon Ox-Tran 1000 tester. Films for testing are prepared as 110 mm squares, sealed into the unit, and swept, with nitrogen on both sides of the film to determine a sample base line and allow the film to equilibrate with nitrogen. Pure oxygen at one atmosphere pressure is then swept over one face of the film for the duration of the test. The nitrogen swept over the opposite face of the film from the test chamber through a Coulox T nickel-cadmium, fuel-cell detector where any oxygen present burned an equivalent amount of the excess hydrogen to generate an electric current proportional to the amount of oxygen. This current, automatically corrected for the sample baseline, is continuously recorded and used to calculate the oxygen permeation value of the sample.

For the laminate containing the polycarbonate film laminated between two layers of the stabilized polyglutarimide film, the permeation of oxygen will be found to be significantly lower than calculated from the permeability values for the separate films.

EXAMPLE 53

This example illustrates the application of an abrasion-resistant coating to the stabilized poly(N-alkyl)dimethylglu-

TABLE 10

STABILIZATION STUDIES WITH OTHER HINDERED AMINES

|  | Ex. 44 | Ex. 45 | Ex. 46 | Ex. 47 | Ex. 48 | Ex.49 | Ex.50 |
|---|---|---|---|---|---|---|---|
| Composition | C | HOB | HOB HA-2 | HOB HA-1 | HOB HA-3 | HOB HA-4 | HOB HA-5 |
| MWw after HID Exposure, × $10^{-3}$ | 25 | 79 | 84 | 116 | 92 | 97 | 86 |
| Yellowness Index |  |  |  |  |  |  |  |
| Original | 2.9 | 2.8 | 3.7 | 4.0 | 4.6 | 4.8 | 4.6 |
| Condition I | 4.5 | 3.7 | 7.4 | 5.4 | 6.7 | 5.2 | 7.0 |
| Condition II | 8.8 | 8.8 | 18.2 | 15.7 | 19.5 | 14.5 | 11.6 |

EXAMPLE 51

In the examples shown above containing organophosphite thermal stabilizer, the 0.15 parts of TNPP may be replaced with 0.25 parts of tris(2,4-di-tert-butylphenyl)phosphite or with 0.11 parts of tetrakis(2,4-di-tert-butylphenyl)-4,4'-biphenylene. At least equivalent thermal stability and color prevention will be seen, and the stabilized glutarimide polymer may be processed into useful objects with acceptable optical properties. Increased stability to processing conditions will be seen with these phosphites under the conditions of Example 33, but with PGI-#2 as the base imide.

EXAMPLE 52

This example illustrates the use of the stabilized glutarimide polymer of Example 3 in a multi-layer combination with polycarbonate. Pressed, laminated structures are prepared by cutting the single films of polycarbonate (177 micrometers thick) and of the stabilized polyglutarimide (102 micrometers thick) into squares approximately 100 by 100 mm; these are stacked against polished metal plates in tarimide of the present invention. For this experiment, a poly(N-alkyl)dimethylglutarimide, designated PGI-#4, is prepared by imidization as described above to achieve a Vicat softening temperature of 170° C. It is stabilized in a manner similar to the earlier examples with 0.25% of BT-1 and 0.25% of HALS-#1.

A solution is prepared of 300 grams methyltriethoxysilane, 350 grams of ethanol and 40 grams of water, and the solution is heated for 8 hours at 70° C. To the solution is added 3 grams of sodium stearate dissolved in 10 grams of acetic acid, and the mixture stirred to assure uniformity. Into the solution is dipped a molded plaque ca. 3 mm. thick of the composition of Example 9, the plaque having been cleaned thoroughly with a detergent and a water rinse. The plaque is totally immersed except for the holder, held in the bath for one minute, and withdrawn at the rate of 40 cm./min. The coated plaque was immediately hardened in an air oven for 30 minutes at 165° C.

EXAMPLE 54

This example illustrates the use of a tie coat between the abrasion-resistant coating and the stabilized poly(glutarimide). A tie coat solution is prepared by adding the following materials in order to a stirred container; amounts are parts by weight.

Isopropanol . . . 56.44 pbw
Toluene . . . 45.51
Low MW PMMA . . . 6.00 (ca. 50,000)
2-Ethoxyethyl . . . 0.93 acetate
Benzotriazole . . . 0.89 BT-1
2-(N-butylperfluorooctanesulfonamide) . . . 0.02
Methyl isobutylketone plus additives . . . 0.30

An injection molded plaque, measuring 7.62 by 5.04 by 0.318 cm, of the polymer of Example 53, is washed with ethyl acetate for 15 seconds, and dried 10 minutes at room temperature. The plaque is then mounted in an upright position, and the tie coat solution is cascaded onto both sides of the plaque. The plaque is then dried three minutes, and then dipped into the solution of 49.78 parts isopropanol, 12.44 parts toluene, 3.55 parts glacial acetic acid, 44.44 parts methyltri- methoxysilane, 31.1 parts colloidal silica, and 0.18 parts sodium acetate. The plaque is withdrawn in 1 minute. The plaque is allowed to dry at room temperature for 30 minutes, and is then cured for one hour at 135° C. The coating will have superior abrasion resistance over the uncoated molding of PGI-#4. Further, the coated sample will show superior adhesion of the abrasion- resistant coating after exposure to HID lamps or long-term weathering relative to a coating applied in the manner of Example 53 or a coating applied to a molding of PGI-#4 without the stabilizer incorporation.

While the invention has been described with reference to specific examples and applications, other modifications and uses for the invention will be apparent to those skilled in the art without departing from the spirit and scope of the invention defined in the appended claims.

What is claimed is:

1. An article prepared from an ultraviolet and thermal resistant poly(glutarimide) comprising:

a polymer containing mers of a poly(N-($C_1$ to $C_4$)alkyl)dimethylglutarimide or mers of a poly(N-hydrogen)dimethylglutarimide;

about 0.05 to about 1.0 weight percent of bis(2,2,6,6-tetramethyl-4-piperidyl)sebacate;

and about 0.01 to about 1.0 percent of a benzotriazole photostabilizer, in the form of a sheet, film, or molded article.

2. An article prepared from an ultraviolet and thermal resistant poly(glutarimide) comprising:

a polymer containing mers of a poly(N-($C_1$ to $C_4$)alkyl)dimethylglutarimide or mers of a poly(N-hydrogen)dimethylglutarimide;

about 0.05 to 1.0 weight percent of bis(2,2,6,6-tetramethyl-4-piperidyl)sebacate;

about 0.01 to about 1.0 percent of a benzotriazole photostabilizer; and about 0.01 to about 1.0 percent of an antioxidant, in the form of a sheet, film, or molded article.

3. The article of claims 1 or 2, wherein the sheet, film, or molded article is a component of a laminate.

4. The article of claims 1 or 2, wherein the sheet, film, or molded article has an abrasion-resistant coating.

5. The article of claim 4, wherein the abrasion-resistant coating comprises a polymerized polyfunctional methacrylate ester.

6. The article of claim 4, wherein the abrasion-resistant coating comprises a polymerized siloxane.

7. The article of claim 4, wherein the sheet, film, or molded article has a tie-coat prior to coating with the abrasion-resistant coating.

8. The article of claim 4, wherein the abrasion-resistant coating contains an ultraviolet stabilizer.

9. The article of claim 7, wherein the tie-coat contains an ultraviolet stabilizer.

10. The article of claim 5, wherein the sheet, film, or molded article has a tie-coat prior to coating with the abrasion-resistant coating.

11. The article of claim 6, wherein the sheet, film, or molded article has a tie-coat prior to coating with the abrasion-resistant coating.

12. The article of claim 8, wherein the sheet, film, or molded article has a tie-coat prior to coating with the abrasion-resistant coating.

13. The article of claim 1 wherein the benzotriazole stabilizer is selected from the group consisting of 2-(2'-hydroxy-3',5'-di-tert-butyl)-5-chlorobenzotriazole; 2-(2'-hydroxy-3'-tert-butyl-5,5'-methylphenyl)-5-chlorobenzotriazole; 2-(2'-hydroxy-3,5'-di-tert-butyl-phenyl)benzotriazole; 2-2'-hydroxy-5'-tert-butylphenyl)benzotriazole; 2(2'-hydroxy-5'-tert-butylphenyl)benzotriazole; 2-(2'-hydroxy-5'-tert-octylphenyl)benzotriazole; and 2-(2'-hydroxy-5'-octylphenyl)benzotriazole.

14. The article of claim 1 wherein the benzotriazole stabilizer is 2-(2'-hydroxy-5'-tert-octylphenyl)benzotriazole.

\* \* \* \* \*